US012245603B1

(12) United States Patent
Bressler et al.

(10) Patent No.: US 12,245,603 B1
(45) Date of Patent: Mar. 11, 2025

(54) MITIGATION OF INVASIVE FISH IN RIVERS AND LAKES

(71) Applicant: HAP-E, LLC, Boca Raton, FL (US)

(72) Inventors: Alan Bressler, Sandy Springs, GA (US); Duane Graves, Maryville, TN (US)

(73) Assignee: HAP-E, LLC, Boca Raton, FL (US)

( * ) Notice: Subject to any disclaimer, the term of this patent is extended or adjusted under 35 U.S.C. 154(b) by 0 days.

(21) Appl. No.: 18/455,789

(22) Filed: Aug. 25, 2023

Related U.S. Application Data (63) Continuation of application No. 16/680,749, filed on Nov. 12, 2019, now abandoned.

(60) Provisional application No. 62/904,086, filed on Sep. 23, 2019, provisional application No. 62/760,193, filed on Nov. 13, 2018.

(51) Int. Cl.
  *A22C 25/14* (2006.01)
  *A22C 25/22* (2006.01)
  *B01J 20/24* (2006.01)
  *B01J 20/30* (2006.01)

(52) U.S. Cl.
  CPC ............ *A22C 25/145* (2013.01); *B01J 20/24* (2013.01); *B01J 20/3021* (2013.01); *B01J 20/3078* (2013.01); *A22C 25/22* (2013.01); *B01J 2220/4812* (2013.01)

(58) Field of Classification Search
  None
  See application file for complete search history.

(56) References Cited

U.S. PATENT DOCUMENTS

| 2004/0140261 A1* | 7/2004 | Taylor | C02F 3/101 |
| | | | 210/931 |
| 2020/0147585 A1* | 5/2020 | Bressler | C01B 32/324 |

FOREIGN PATENT DOCUMENTS

| CN | 105460912 B * | 1/2018 | C01B 25/32 |

OTHER PUBLICATIONS

Tsehaye et al (Prospects for Fishery-Induced Collapse of Invasive Asian Carp in the Illinois River, Fisheries, vol. 38, No. 10, (2013)) (Year: 2013).*
Admassu et al ("Feasibility of Using Fishbone Apatite as a Substitute for Hydroxyapatite in Remediating Aqueous Heavy Metals," J. Haz. Mat. B69, 1999, pp. 187-196). (Year: 1999).*
Nurhadi et al ("Utilization of fish bone as adsorbent of Fe3+ ion by controllable removal of its carbonaceous component", IOP Conf. Series: J Phys: Conf. Series 1022 (2018) 012031 published online on May 15, 2018). (Year: 2018).*

(Continued)

*Primary Examiner* — Michael Forrest
(74) *Attorney, Agent, or Firm* — Troutman Pepper Locke LLP; Ryan A. Schneider; Korbin M. Blunck (57) ABSTRACT

A method of mitigating the environmental impact of invasive fish in rivers and lakes is provided. The method comprising recruiting overfishing of a species of fish harvested from one or more rivers or lakes in which the species of fish is invasive, obtaining fish bones from the harvested fish, producing a sorbent from the fish bones by drying and milling the fish bones into sorbent particles having a metal sorption capacity effective for treating a metal contaminated material, and treating metal contaminated material with an effective amount of the sorbent to form immobilized reaction products of the metal contaminated material and the sorbent.

18 Claims, 2 Drawing Sheets

(56) References Cited

OTHER PUBLICATIONS

Yeggy ("A Guide to Carbon Certification", Nov. 2012, Retrieved on Dec. 7, 2021, Retrieved from the internet: https://www.wpqmag.com/guide-carbon-certification.) (Year: 2012).*
Machine Translation for CN-105460912-B (Year: 2018).*

* cited by examiner

MITIGATION OF INVASIVE FISH IN RIVERS AND LAKES

CROSS-REFERENCE TO RELATED APPLICATIONS

This application is a continuation of, and claims priority under 35 U.S.C. § 120 to, U.S. patent application Ser. No. 16/680,749, filed 12 Nov. 2019, which claims priority under 35 U.S.C. § 119 to U.S. Provisional Patent Application No. 62/760,193, filed 13 Nov. 2018 and U.S. Provisional Patent Application No. 62/904,086, filed 23 Sep. 2019, the entire contents of each of which are fully incorporated herein by reference in its entirety.

FIELD

The present disclosure relates generally to managing invasive fish species, and more specifically to mitigating the environmental impact of invasive Asian carp.

BACKGROUND

Carp represent various species of freshwater cyprinid fish native to Asia. Many are now found worldwide and often considered a destructive invasive species (Annual Report to Congress (December 2014) "*Summary of Activities and Expenditures to Manage the Threat of Asian Carp in the Upper Mississippi and Ohio River Basins June 2012 to June 2014*," U.S. Fish and Wildlife Service). For example, the bighead, black, grass, and silver carp, sometimes referred to in the United States (U.S.) as "Asian carp." were variously imported into the Southern U.S. in the 1960s and 1970s as a way to control algae blooms and aquatic vegetation in farm ponds, sewage lagoons and aquaculture facilities (Annual Report to Congress (December 2014), supra; and U.S. Congressional Research Service (Oct. 19, 2017) "*Asian Carp and the Great Lakes Region*"). Yet the fish escaped within a few years and have been spreading ever since throughout the Mississippi, Missouri, Illinois, Tennessee, and Ohio River basins, including north towards the Great Lakes (*Annual Report to Congress* (December 2014), supra); and U.S. Congressional Research Service (Oct. 19, 2017), supra).

Of the Asian carp now in North America, the bighead and silver are arguably the most destructive (U.S. Congressional Research Service (Oct. 19, 2017), supra). The bighead averages about a meter in length and weighs around 27 kilograms. Although silver carp can grow larger, they are slightly smaller on average than the bighead and notorious for jumping out of the water when disturbed. As filter feeders, the bighead and silver carp can eat up to 20 percent of their body weight in plankton each day, the same food most native aquatic species rely on for survival. They also populate to significant densities, especially the silver carp. So once introduced, Asian carp, the plankton eaters in particular, have the potential to rapidly displace native fish and other species (Phelps et al. (2017) *PLOS ONE* 12 (9): e0184081).

Various approaches have been undertaken to limit the damage. For example, the U.S. Government has developed an extensive plan to keep the Asian carp from spreading into the Great Lakes that includes redirecting water flows and deployment of various mechanical, electrical, biological, and chemical in-water barriers (U.S. Congressional Research Service, supra; and Irons, K. and G. Behnfeldt (Jan. 11, 2018) "*Illinois Department of Natural Resources Asian Carp Business Process Analysis Final Report and Action Plan*," Illinois Department of Natural Resources and Tetra Tech). Commercial harvesting of the fish has also been vigorously pursued, including extensive marketing campaigns to increase demand for the Asian carp (Irons, K. and G. Behnfeldt, supra), including as a food product, since the most common use for fisheries resources is food (Pasko et al. (2014) *Management of Biological Invasions* 5 (3): 263-277).

Unfortunately, the Asian carp continues to spread due to its prolific adaptability and the inherent shortcomings of current mitigation efforts. Escapements past barriers continue to be recorded even after years of research, deployment and optimization (U.S. Congressional Research Service, supra), calling into question the practicability and efficacy of massive construction and barrier efforts in general.

In addition, although fishing pressure may have significant potential to control the Asian carp, existing harvesting programs have fallen short as evidenced by the fish's continued advance northward, eastward, and westward (U.S. Congressional Research Service, supra). One problem here is the difficulty in catching the filter feeding bighead and silver carp with rod and tackle, eliminating reliance on anglers as a support leg in a recruitment overfishing program. On the other hand, commercial fishing efforts continue to focus on catching Asian carp for food, which creates yet another problem for recruitment overfishing programs since it pays commercial fisherman more to go after larger fish while avoiding the smaller ones (Seibert et al. (2015) *Management of Biological Invasions* 6 (3): 295-302).

There is a clear unmet need to find additional ways to reduce the environmental impact and spread of invasive Asian carp. A particular need exists to further incentivize harvesting of invasive Asian carp and to include smaller carp in this effort. The present disclosure addresses these and other needs.

REFERENCES

Various references review the history and status of Asian carp as an invasive species, for example: (Annual Report to Congress (December 2014) "*Summary of Activities and Expenditures to Manage the Threat of Asian Carp in the Upper Mississippi and Ohio River Basins June 2012 to June 2014*," U.S. Fish and Wildlife Service).

Re-channeling and physical barrier efforts to control invasive Asian carp are disclosed in, for example: U.S. Congressional Research Service (Oct. 19, 2017) "*Asian Carp and the Great Lakes Region*".

Harvesting efforts to control invasive Asian carp are disclosed in, for example: Irons, K. and G. Behnfeldt (Jan. 11, 2018) "*Illinois Department of Natural Resources Asian Carp Business Process Analysis Final Report and Action Plan*," Illinois Department of Natural Resources and Tetra Tech; Phelps et al. (2017) *PLOS ONE* 12 (9): e0184081; Pasko et al. (2014) *Management of Biological Invasions* 5 (3): 263-277; and Seibert et al. (2015) *Management of Biological Invasions* 6 (3): 295-302.

BRIEF SUMMARY

A method of mitigating the environmental impact of invasive Asian carp is provided. The method generally includes providing a metal sorbent comprising metal sorbent particles derived from defleshed bones of Asian carp harvested from a body of water in which the carp is invasive. The metal sorbent is in turn utilized in treating a metal contaminated material with an effective amount of the metal sorbent. The process is repeated one or more times as needed so as to support harvesting of the invasive Asian carp from the body of water.

More specifically, in one embodiment, the method of mitigating the environmental impact of invasive Asian carp comprises:

obtaining Asian carp bones of a plurality of Asian carp harvested from one or more bodies of water in which the carp is invasive;

producing a metal sorbent from the Asian carp bones by drying and milling the bones into metal sorbent particles having a metal sorption capacity effective for treating a metal contaminated material, such as soil, sediment, water, or a leachate from a soil or waste site contaminated with metals; and repeating steps (i) and (ii) one or more times as needed so as to support harvesting of the invasive Asian carp, whereby the environmental impact of the Asian carp in the one or more bodies of water in which the carp is invasive is mitigated.

In a related embodiment, the method of mitigating the environmental impact of invasive Asian carp comprises:

obtaining metal sorbent particles derived from drying and milling bones of a plurality of Asian carp harvested from a body of water in which the carp is invasive; and treating a metal contaminated material, such as soil, sediment, water, or a leachate from a soil or waste site contaminated with metals, with an effective amount of a metal sorbent comprising the metal sorbent particles so as to form immobilized reaction products of the metal contaminated material and the metal sorbent particles, whereby the environmental impact of the Asian carp on the body of water in which the carp is invasive is mitigated.

Another embodiment is a green and sustainable method of treating a metal contaminated material, the method comprising:

obtaining a metal sorbent comprising bone particles of Asian carp harvested from a body of water in which the carp is invasive;

treating a metal contaminated material, such as soil, sediment, water, or leachate from a soil or waste site contaminated with metals, with an effective amount of the metal sorbent so as to form immobilized reaction products of the metal contaminated material and the metal sorbent; and repeating steps (i) to (ii) as needed so as to support harvesting of the carp from the body of water and treating the metal contaminated material.

DESCRIPTION OF SPECIFIC EMBODIMENTS

As summarized above, provided is a method of mitigating the environmental impact of invasive Asian carp through production and use of metal sorbent comprising metal sorbent particles derived from bones of the carp. To obtain the bones for the metal sorbent particles, the carp are harvested from a body of water in which the carp is invasive. Accordingly, production and/or use of the metal sorbent generates demand for harvesting the invasive Asian carp.

In general, the method involves (i) obtaining bones from a plurality of invasive Asian carp, (ii) producing a metal sorbent comprising the bones, (iii) treating a metal contaminated material with an effective amount of the metal sorbent, and (iv) repeating steps (i) to (iii) as needed so as to support harvesting of the carp.

In one embodiment, the method includes (i) obtaining bones from a plurality of invasive Asian carp, (ii) producing a metal sorbent comprising the bones, and (iii) repeating steps (i) to (ii) as needed so as to support harvesting of the carp.

In one embodiment, the method includes (i) obtaining a metal sorbent comprising bone particles of invasive Asian carp, (ii) treating a metal contaminated material with an effective amount of the metal sorbent, and (iii) repeating steps (i) to (ii) as needed so as to support harvesting of the carp.

The subject method therefore reduces the environmental impact of invasive Asian carp by supporting harvesting of the carp as well as remediation of a metal contaminated material.

A featured embodiment of producing the metal sorbent includes drying and milling the bones, the drying including heating at a temperature of at least about 100° C. and for a period of time effective to generate metal sorbent particles at water dryness and having a metal sorption capacity effective for treating a material contaminated with at least one metal selected from the group consisting of cadmium, copper, strontium, uranium, and zinc. A related embodiment is where the heating is conducted without charring the bones so as to produce uncharred metal sorbent particles. Another related embodiment is where the heating without charring produces uncharred metal sorbent particles retaining associated organics while being substantially devoid of a foul fish odor. An additional embodiment is where the heating is conducted with charring so as to produce charred metal sorbent particles. The subject methods may further include measuring the metal sorption capacity of a test sample of the metal sorbent, as well as certifying the metal sorbent based on the measuring. Production in certain embodiments includes packaging of the metal sorbent in a suitable container for keeping the metal sorbent dry and certifying the invasive Asian carp content thereof.

A featured embodiment of the metal sorbent obtained for treating is where it is substantially devoid of a foul fish odor, and may include uncharred Asian carp bone particles retaining residual organics, charred Asian carp bone particles with little to no residual organics, or a blend of the uncharred and charred bone particles. The metal sorbent in some embodiments includes other metal sorbent components, such as APATITE II and the like. A specific embodiment of the metal sorbent is where it includes metal sorbent particles derived from at least one fish other than Asian carp, for example, catfish, tilapia, and so forth. As such, the metal sorbent employed for treating a metal contaminated material in certain embodiments includes one or more additives in addition to invasive Asian carp bone particles.

The subject method provides multiple advantages over previous mitigation efforts, including an incentive-based mechanism to reduce invasive Asian carp numbers in a manner that not only differs from harvesting the carp for food and other purposes, but synergistic with those efforts. Importantly, the large quantities of metal sorbent necessary for effective remediation of soil, sediment, water, or a leachate from a soil or waste site contaminated with metals, creates far greater opportunity for Asian carp demand than food products, pet products, or fertilizer, which make up virtually all of the present uses for the resource and have proven insufficient to reduce populations of the invasive Asian carp species. The subject method also addresses the unmet need of incentivizing the harvesting of smaller carp. For example, although less feasible as a commercial food source, smaller carp are readily utilizable in the subject method. This later feature is significant since smaller carp down to about 300 to 400 millimeters in length or even smaller can be exploited by the present method to reasonably support recruitment overfishing objectives.

An additional advantage is the production of a potent metal sorbent product capable of remediating even the most heavily metal polluted environments. For example, compared to known fish bone metal sorbent products, such as APATITE II (PIMS NW, Inc., U.S.A.), the Asian carp fish bone particles as prepared and described herein for the first time are found to possess metal sorption capacities effective for treating various state and federal waste site priority contaminants such as lead, cadmium, copper, manganese, zinc, and others. Significantly, the subject Asian carp bone particles also exhibit surprising and unexpectedly high sorption activities against additional priority metals such as strontium and nickel that otherwise exhibit poor sorption against fish bone products exemplified by APATITE II. There are many other attendant benefits of the subject method, including production of low odor fish bone particles that, unlike other fish bone products such as APATITE II, maintain a high metal sorption capacity for strontium and many other USEPA Target Analyte List (TAL) metals.

As such, the subject method establishes a significant value for the invasive Asian carp, and not just for commercial fishers, fish processing plants, and those using the Asian carp metal sorbent as disclosed herein. Indeed, the subject method creates a multi-tiered value-added product that also benefits communities and economies impacted by invasive Asian carp, and virtually anyone or anything suffering from a metal pollution problem (i.e., ecosystems, individuals, communities, businesses, companies, factories, governments etc.).

Accordingly, the subject method is particularly useful in supporting harvesting of invasive Asian carp, including the smaller ones, and thus beneficial in mitigating the environmental impact of the carp.

Before the subject disclosure is described further, it is to be understood that the disclosure is not limited to the particular embodiments described below, as variations of the particular embodiments may be made and still fall within the scope of the appended claims. It is also to be understood that the terminology employed is for the purpose of describing particular embodiments, and is not intended to be limiting. Instead, the scope of the present disclosure will be established by the appended claims. In addition, many modifications may be made to adapt a particular situation, material, composition of matter, process, process step or steps, to the objective, spirit and scope of the present invention. All such modifications are intended to be within the scope of the claims made herein.

In this specification and the appended claims, the singular forms "a," "an" and "the" include plural reference unless the context clearly dictates otherwise. Conversely, it is contemplated that the claims may be so-drafted to exclude any optional element. This statement is intended to serve as antecedent basis for use of such exclusive terminology as "solely," "only" and the like in connection with the recitation of claim elements or by use of a "negative" limitation.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the invention. Also, it is contemplated that any optional feature of the inventive variations described herein may be set forth and claimed independently, or in combination with any one or more of the features described herein.

Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the disclosure, the preferred methods, devices and materials are now described.

All existing subject matter mentioned herein (e.g., publications, patents, patent applications and hardware) is incorporated by reference herein in its entirety. The referenced items are provided solely for their disclosure prior to the filing date of the present application. Nothing herein is to be construed as an admission that the present disclosure is not entitled to antedate such material by virtue of prior invention.

In further describing the subject method of mitigating the environmental impact of invasive Asian carp, production of the carp metal sorbent is described first in greater detail, followed by a detailed description of its use in the treatment of a metal contaminated material, followed by a detailed description of exemplary embodiments in the Examples.

Mitigating Invasive Asian Carp by Metal Sorbent Production

One aspect of the subject mitigation method generally involves obtaining bones from the invasive Asian carp and utilizing the bones in the production of a metal sorbent. Production of the metal sorbent incentivizes large-scale removal and consumption of the carp, as use of the metal sorbent in large volumes is common for cleanup of many environmentally-impaired Superfund and other polluted sites. The environmental impact of the carp is in turn mitigated by its removal and use as a metal sorbent. As such, a feature of the subject method involves obtaining the bones of a plurality of Asian carp harvested from one or more bodies of water in which the carp is invasive.

By "Asian carp" is intended grass carp (*Ctenopharyngodon idelle*), silver carp (*Hypophthalmichthys molitrix*), largescale silver carp (*Hypophthalmichthys harmandi*), bighead carp (*Hypophthalmichthys nobilis*), black carp (*Mylopharyngodon piceus*). Of particular interest are the bighead, and silver carp, and more specifically the silver carp.

By "bodies of water in which the Asian carp is invasive" is meant any body of water in which the Asian carp is a non-native species. This includes, but is not limited to, ponds, streams, creeks, rivers, lakes, reservoirs, quarries, canals, channels and the like in which the Asian carp is a non-native species. Examples include, but are not limited to, bodies of water in North America, and more particularly those in the Southern United States and northward toward the Upper Midwest and Great Lakes region of the United States and Canada as well as the upper Missouri river basin as far north as North Dakota.

Of specific interest is where the body of water is selected from a river, lake, or connecting waterway of the Mississippi River System. By "Mississippi River System" is intended a mostly riverine network of the U.S. which includes the Mississippi River itself and its numerous natural tributaries and distributaries, as well as connecting waterways and lakes; sometimes referred to as or "Mississippi River Watershed" or "Western Rivers." The Arkansas, Illinois, Missouri, Ohio, Red, Allegheny, Tennessee, and Wabash rivers are examples of tributaries to the Mississippi River System. The Atchafalaya River is an example of a distributary of the Mississippi River System. The Illinois Waterway, the Tennessee-Tombigbee Waterway, and the Gulf Intracoastal Waterway are examples of the connecting waterways.

A specific embodiment is where the plurality of the carp includes small Asian carp having a lower cutoff target length down to about 300 to 400 millimeters. As related embodiment is where the harvesting includes small, sexually immature Asian carp so as to support recruitment overfishing. Lowering the fish size catch cutoff is designed to encourage the harvesting of smaller fish that are ordinarily of little value to commercial fisherman. Harvesting of smaller fish has the added benefit of encouraging recruitment overfishing, which in turn is more likely to reduce spawning populations (Seibert et al., supra).

By "Asian carp bones" is intended the skeletal carcass of the Asian carp. Bones prepared from fresh or fresh frozen Asian carp are preferred. In general, the skeletal carcass, or simply the carcass or defleshed bones as it is sometimes referred to herein, consists essentially of the fish's skeletal remains left over after bulk liquids, flesh, skin, and organs are removed. In many embodiments, the Asian carp bones include residual moisture and associated organics such as marrow and bits of skin, flesh, cartilage, tendons and various other non-bone materials, which are typically left over after bulk components are separated from the carcass.

For example, there are many ways to separate bones from the rest of the fish, and the associated non-bone materials relate in large part to how the fish is processed. Specifically, fish bone removal, such as with a fillet knife and/or with fish processing machinery, usually results in a certain amount of visible flesh and other non-bone material left on, or otherwise associated with, the bones. A good example here is the roller-type fish bone separating machine, which is essentially a rolling press used to separate fish meat from fish bone and skin by pressing the fish meat into the interior of a rolling drum through perforated orifices in the drum, while leftovers including skin and bone, remain on the exterior of the drum.

Of course the fish bones can be further processed so as to remove excess leftover materials by numerous bone cleaning methods well known in the art. Such bone cleaning methods include, but are not limited to, scrubbing, boiling, washing, chemical treatment, biological treatment, and so forth. The fish carcasses can also be heat treated to remove or convert the excess residual materials, with or without milling at this stage, as described in greater detail below. Thus, in as many embodiments the Asian carp bone is substantially clean and free of bulk liquids, flesh, skin, and organs.

The Asian carp bones are preferably obtained from a processing source or facility that processes the fish into various products. In some embodiments, the bones are obtained concurrent with drying and milling. For example, the fish carcasses along with other fish parts can be milled into fish bone meal, and heat treated under conditions effective to produce essentially activated carbon and charred fish bone particles, which can be even further processed if desired, for example, by additional milling so that the main components are activated carbon and refined charred fish bone particles. In other instances, the bones are obtained first, followed by drying and milling. Either way, drying and milling of the carp bones can occur sequentially or concurrently with each other, in any order and in various combinations, as well as concurrent with or after the carp bones are obtained, with the proviso that the carp bone particles produced therefrom are effective as a metal sorbent described in greater detail below.

For example, drying generally comprises heating the Asian carp bones at a temperature and for a period of time effective to reach at least water dryness. By "water dryness" is intended dry to the touch or otherwise having a moisture content less than about 15% by weight, typically a moisture content of less than about 10% by weight, and usually a moisture content of less than about 5% by weight.

Of specific interest is where the drying comprises heating at a temperature of at least about 100 and for a period of time effective to dry the bones to water dryness, and in as many embodiments, milling so as to obtain dried fish bone metal sorbent particles having a metal sorption capacity effective for treating a material contaminated with at least one cationic metal, including, but not limited to, lead, cadmium, strontium, copper, zinc, manganese, and uranium.

Milling of the fish bone can be carried out by numerous methods known in the art. For example, there are many different types of mills that can be used to break down the Asian carp bones into smaller pieces by grinding, crushing, cutting, or any combination thereof. This includes, but not limited to, blenders and grinding machines such as a ball mill, rod mill, autogenous mill, SAG mill, pebble mill, high pressure grinding rolls, buhrstone mill, vertical shaft impactor mill (VSI mill), tower mill, and so forth. Blenders, ball mills, gristmills, and jet mills are of specific interest.

The milling is normally carried out to a coarse milled mixture having an average metal sorbent particle size of about 4 to 50 mesh, about 10 to 45 mesh, generally about 12 to 40 mesh, about 14 to 35 mesh, and usually about 16 to 30 mesh, about 18 to 25 mesh, and more typically about 20 mesh on average. As can be appreciated, the 10 to 45 mesh range corresponds to particles averaging about 2000 microns down to about 350 microns in diameter, with 20 mesh averaging around 840 microns in diameter. As can also be appreciated, in certain embodiments, the particle sizes are smaller than 45 mesh (i.e., smaller than 350 microns). In as many embodiments, the particles include larger pieces, including 0.5 to a few centimeters, and sometimes even larger chunks of bone, dispersed within smaller particles that make up most of the material. The flexibility here allows the particle size and mixtures thereof to be chosen as necessary for a particular given end use and can be tailored for such purpose.

Turning now to additional aspects of the drying. The fish bone can be dried by any number of methods, including but not limited to, air drying, heating, freeze drying and the like. As noted above, the drying is preferably carried out by heating the fish bones at a temperature and for a period of time effective to at least reach water dryness.

Of specific interest is heating the fish bones under conditions so as to remove or otherwise suppress a foul fish odor. In one embodiment, the fish bones are heated to a temperature of at least about 100° C. for a period of time effective to reach at least water dryness and mitigate the foul fish odor associated with the fish. The duration and temperature to mitigate the foul fish odor in this embodiment can be readily determined by monitoring the odor. Surprisingly, odor removal under such conditions can be accomplished with or without charring the Asian carp fish bones. As such, the heating is generally under conditions further selected to produce uncharred or charred fish bone particles.

By "charred" is intended a material that has been subjected to a high temperature without allowing complete combustion to occur, resulting in the material appearing blackened or scorched, but not overly burnt. The material appearing blackened or scorched is referred to as char and generally the by-product of light gases being driven out or released and organic substances being converted into carbon or carbon-containing residue during incomplete or minimal loss to combustion. The term "uncharred" is intended to mean a material that is not charred. By way of example, charred fish bones appear to have a blackened or scorched surface as noted above, whereas uncharred fish bones retain a natural off-white color.

Production of uncharred metal sorbent particles is therefore at a temperature and for a period of time that avoids scorching or blackening of the fish bone material. A featured aspect is where the drying and milling includes heating without charring so as to produce uncharred metal sorbent particles retaining associated organics while being substantially devoid of a foul fish odor. Heating without charring for this purpose is typically carried out at a range of about 100° C. to about 300° C. for about 1 to 24 hours, and more typically about 120° C. to 200° C. for about 2 to 4 hours. The conditions can of course be selected by adjustment to obtain the desired amount of drying and odor removal without charring. For example, heating the Asian carp bone at 120° C. for approximately 1 hour or more is effective for generating uncharred bone devoid of the foul fish odor, and with milling, metal sorbent particles devoid of the foul fish odor.

It will be appreciated that conditions in addition to time and temperature can be adjusted when making the subject uncharred metal sorbent particles. For example, atmospheric conditions can be adjusted, such as heating the bones in the presence or absence of air or select gases, adjusting the pressure and so forth. Various additives can also be included, such as buffering agents, acids, bases and the like when it is desired to adjust a property such as the pH profile of the material. Binders, fillers, flow agents, tracking dyes and the like are additional examples.

The subject uncharred metal sorbent particles prepared in the above manner without charring also exhibit certain unexpected and surprising metal sorption capacities, including mitigation of the foul fish odor without charring in combination with increased metal sorption capacity for strontium (Sr) relative to an APATITE II control. As can be seen from the results in the Examples below, the metal sorbent capacity for the 120° C.-treated Asian carp bone sorbent is about twice that compared to the APATITE II control. Thus, the uncharred metal sorbent particles in certain embodiments are further characterized as having increased metal sorption capacity for strontium (Sr) relative to the APATITE II control.

In contrast, production of charred metal sorbent particles is carried out at a temperature and a period of time effective to at least scorch or blacken the Asian carp fish bone material. This includes, but is not limited to, conditions effective to char the Asian carp bone material before, during, or after milling, or any combination thereof. In general, the conditions for charring are readily determined and adjusted for a given end result, such as adjusting both the temperature and duration of heating while monitoring charring of the product.

For example, charring is generally carried out by heating the Asian carp bone material to at least about 300° C. or greater, more typically about 400° C. or greater, such as about 400° C. to about 600° C. for about 1 to 2 hours, usually about 450° C. to about 550° C. for about 1 hour, such as about 485° C. for about 1 hour.

As with the uncharred fish bone materials described above, conditions in addition to time and temperature can be adjusted when making the subject charred metal sorbent particles to tailor the material for a given end use. Adjusting the atmospheric conditions is of specific interest, such as heating the bones in the presence of oxygen to promote combustion, in an inert atmosphere so as to avoid or reduce combustion (i.e., pyrolysis), or in the presence of oxygen after pyrolysis so as to promote oxidation and activation. An example here is the charring of the raw Asian carp bones alone or as Asian carp fish bone meal under conditions effective to produce metal sorbent particles comprising either non-activated char (ash), activated char (activated carbon), or a combination thereof.

The activated char can be produced by physical, chemical, or a combination of physical and chemical activation (Sec, e.g., Hagemann et al. (2018) *Water* 10 (182): 1-19). Physical activation usually involves heating the Asian carp bone material using hot gases under pyrolysis conditions at temperatures in the range of about 600° C. to 900° C., usually in inert atmosphere with gases like argon or nitrogen. Air is then introduced so as to form activated carbon associated with the Asian carp bone material. This activation/oxidation step is generally achieved by exposing the Asian carp bone material to oxidizing atmospheres (e.g., oxygen or steam) at temperatures above 250° C., usually in the temperature range of about 600° C. to 1200° C.

Chemical activation involves coating or impregnating the raw Asian carp bone material with certain chemicals, such as an acid, strong base, or a salt (e.g., phosphoric acid, potassium hydroxide, sodium hydroxide, and calcium chloride). Then, the raw Asian carp bone material is carbonized or charred at lower temperatures (e.g., 450° C. to 900° C.). As can be appreciated, chemical activation is usually preferred over physical activation owing to the lower temperatures and shorter time needed for activating material.

In certain embodiments, charring is under conditions effective to convert associated organics into char, in some embodiments, under conditions effective to convert the bone material into char, and in other embodiments, under conditions effective to convert essentially the associated organics and bone material into char, with the proviso that the char can be non-activated or activated.

The results depicted in the Example below demonstrate that charring and milling of the Asian carp bone results in metal sorbent particles with surprising and unexpected properties. As can be seen, the Asian carp bone particles charred at 485° C. exhibit a similar metal sorbent capacity for strontium compared to the 120° C.-treated carp bone material, about twice for zinc relative to the 120° C.-treated material, about three times for copper and cadmium relative to the 120° C.-treated material, about four times for manganese relative to the 120° C.-treated material, and about nine times for nickel relative to the 120° C.-treated material. As also shown, the charred Asian carp bone particles exhibit a metal sorbent capacity for strontium and copper of about twice that of the APATITE II control, about three times for cadmium and manganese relative to APATITE II control, and an order of magnitude or larger metal sorbent capacity for nickel relative to APATITE II control. As such, in some embodiments the charring increases the metal sorption capacity for at least cadmium (Cd), copper (Cu), and nickel (Ni) relative to APATITE II control.

It will be also appreciated that sorbent materials in addition to Asian carp bones can be included in the production and use of the subject metal sorbent. For example, bycatch is common with fishing, so materials in addition to Asian carp such as other freshwater fish bone material can be included. Also, the Asian carp component are in some instances supplemented with other materials, particularly metal sorbent particles derived from other fish bones, especially freshwater fish such as catfish, trout, tilapia etc. In some embodiments, saltwater fish bone materials are included, even other metal sorbent products such as APATITE II. In other embodiments, apatite containing materials other than fish bone are included, such as beef bone or even mined minerals such as hydroxyapatite minerals. In as many embodiments, a mixture of various apatite containing materials are included with the Asian carp bone derived components. In consideration of quality control and activity assurances, whether the subject metal sorbent is essentially all derived from Asian carp bone, or includes other sorbent apatite-containing materials, periodic product testing is of interest.

As such, in certain embodiments, the metal sorbent comprises metal sorbent particles derived from at least one fish other than Asian carp. For example, in some embodiments the subject method of production and use employs an Asian carp bone metal sorbent that further comprises metal sorbent particles derived from a freshwater fish selected from the group consisting of catfish, tilapia, trout, striped bass, and combinations thereof.

Accordingly, the subject method may further comprise measuring the metal sorption capacity of a test sample of the metal sorbent. This aspect may further include providing a certified analysis of the metal sorbent based on the measuring.

Analysis of the raw materials, intermediates and/or final metal sorbent product can be carried out for batch to batch quality control and product specification. In this way the natural variability in the Asian carp population, harvesting practices and the like are addressed for application tolerances. This includes generating a document attesting that a specific batch of Asian carp metal sorbent has undergone specified testing with specified results.

Usually the analysis is done on test samples representing the batch or a series of batches. Of specific interest is measuring the metal sorption capacity of a select batch of Asian carp metal sorbent product, and providing the metal sorption capacity analysis or portion thereof in a product specification and/or certificate of analysis for that material. For example, the analysis generally includes testing for metal sorption capacity against one or more different metals to confirm that a given batch of the Asian carp metal sorbent product meets or exceeds its product specification.

The analysis may further include one or more of the results from raw material and intermediate testing, as well as moisture content, calcium content, phosphorus content, activation type, activation level, ash content, pH range in water, and so forth. In turn, knowing the product's minimum, actual, and/or maximal metal sorption capacity against a standard set of metals and conditions, or one or more specific metals and conditions, and the like aids quality assurance, reproducibility and use of the product in the field.

Specific examples include, but are not limited to, a product specification in which the metal sorbent includes one or more characteristics selected from: substantially devoid of a foul fish odor; an average particle size of about 4 to 40 mesh; a moisture content of less than about 35% by weight, generally 25% by weight or less, 20% by weight, 15% by weight, typically about 10% by weight, and usually less than about 5% by weight; and a metal sorption capacity, when measured at equilibrium in a standard solution of about 2 grams of a coarse milled mixture of the metal sorbent particles admixed with about 1 gram of metal present as a soluble salt in about 1 liter of deionized water at 25° C., is at least: (a) 40 milligrams of cadmium (Cd) per gram, (b) 40 milligrams of strontium (Sr) per gram, (c) 25 milligrams of copper (Cu) per gram, and (d) 1 milligram of nickel (Ni) per gram.

Packaging of the Asian carp metal sorbent produced by the subject method is also provided. The packaging can be any container suitable for storage, shipping, and/or deployment, and in any size ranging from sample sizes up to shipping containers and larger. This includes, but is not limited to, containers such as bags, totes, crates, barrels, holds and the like. Examples of suitable containers are those capable of holding about 1 kilogram or greater, usually about 1 to 20,000 kilograms, and increments thereof, such as 5, 10, 15, 20, 25, 30, 35, 40, 45, 50, 100 kilograms as so forth. Packaging for storage is generally one that keeps the metal sorbent dry. Packing for transport is of a nature that permits moving and stacking and often will be adapted for grabbing, lifting, moving and the like. Packaging for deployment may be specialized for dispersing the metal sorbent, for example, a specialized bag, bale, or tote for feeding a dispersing machine, such as a hollow-stem augur or rotary head cutter. Usually, the same packaging is utilized for storage, transport and dispersal. Weighing, bagging and packaging the Asian carp metal sorbent with equipment and machines suitable for this purpose is also provided. As such, a featured aspect is where the method further comprises packaging the metal sorbent in a suitable container selected from the group consisting of storage, transport, deployment, and combinations thereof.

Mitigating Invasive Asian Carp by Metal Sorbent Use

Another aspect of mitigating the environmental impact of invasive Asian carp employs a metal sorbent produced from the bones of the carp. This embodiment comprises a first step (i) of obtaining a metal sorbent derived from the bones of invasive Asian carp, and a second step (ii) of treating a metal contaminated material with an effective amount of the metal sorbent so as to form immobilized reaction products of the metal contaminated material and the metal sorbent.

By "immobilized reaction products of the metal contaminated material and the metal sorbent" is intended that the reaction products formed when combining the metal contaminated material with the metal sorbent are immobilized or otherwise no longer soluble. For example, polluting metals in a material are made insoluble by the treatment (e.g., trapping of metals by binding them in hydroxyapatite complex, as an insoluble salt, etc.).

More specifically, the first step (i) includes obtaining metal sorbent particles produced by drying and milling de-fleshed bones of a plurality of Asian carp harvested from a body of water in which the carp is invasive. As described above, the drying and milling can be carried out in any order, separately or together, intermittently or continuously, with the proviso that it includes de-fleshed Asian carp bones obtained from a plurality of Asian carp harvested from a body of water in which the carp is invasive. As also described above, drying of the bones is preferably carried out at a temperature of at least about 100° C. for a period of time effective to substantially eliminate a foul fish odor, and the milling is preferably carried out to at least a coarse milled mixture having an average metal sorbent particle size of about 4 to 40 mesh. It is also preferred that the metal sorbent particles have a moisture content of less than about 30% by weight, 15% by weight, more preferably less than about 10% by weight, and specifically less than about 5% by weight. It is also preferred that the metal sorbent particles have a metal sorption capacity that, when measured at equilibrium in a standard solution of about 2 grams of a coarse milled mixture of the metal sorbent particles admixed with about 1 gram of a metal present in a suitable salt in about 1 liter of deionized water at 25° C., is at least: (a) 40 milligrams of cadmium per gram, (b) 40 milligrams of strontium per gram, (c) 25 milligrams of copper per gram, and (d) 55 milligrams of zinc per gram. When the metal sorbent particles are charred. the metal sorbent particles have a metal sorption capacity in the standard solution of at least: (a) 130 milligrams of cadmium per gram, (b) 40 milligrams of strontium per gram, (c) 110 milligrams of copper per gram, (d) 110 milligrams of zinc per gram, and (c) 35 milligrams of nickel (Ni) per gram. The metal sorbent particles are preferably obtained pre-made as described herein.

The second step (ii) includes treating a metal contaminated material, such as soil, sediment, wastewater, a leachate from a soil or waste, or an industrial waste stream contaminated with metals, with an effective amount of a metal sorbent comprising the metal sorbent particles so as to form immobilized reaction products of the metal contaminated material and the metal sorbent particles.

By "treating a metal contaminated material," is intended to immobilize, stabilize, clean-up, remediate, mitigate or otherwise treat metal-contaminated water, soil or waste of any kind, such as soil, sediment, water such as groundwater, wastewater, a leachate from a soil or waste site, including industrial waste streams contaminated with polluting metals, and so forth. Polluting metals of particular interest are cationic metals on the USEPA Target Analyte List (TAL) as well as various cationic lanthanides and actinides, including radionuclides. For example, cationic metals of specific interest include, but are not limited to, aluminum, antimony, arsenic, barium, beryllium, cadmium, calcium, cobalt, copper, iron, lead, magnesium, manganese, mercury, nickel, potassium, silver, sodium, thallium, zinc, as well as various cationic lanthanides and actinides, including radionuclides such as radioactive isotopes of strontium, uranium and plutonium and so forth.

The effective amount of the Asian carp metal sorbent particles is generally up to about 10% by weight of the metal contaminated material, usually up to about 5% by weight of the metal contaminated material. In other words, the effective amount of the Asian carp metal sorbent particles is about 10% or less, and usually about 5% or less by weight of the metal contaminated material. More often, the effective amount is about 0.5% to 10%, typically about 1% to about 8%, and usually about 1% to about 5% by weight of the metal contaminated material. For soil polluted with metals, the specific application rate is readily determined by the concentration and composition of metals in the waste and through testing by mixing the metal sorbent particles with the specific waste to quantify treatment effectiveness per mass of metal sorbent particles. For liquid wastes, the specific application rate is based on metal concentration in the waste, reaction rate between the metal sorbent particles and the metals to be treated, and binding capacity of the particles.

In many embodiments, the metal sorbent application rate for treating solids is greater than it is for treating liquids. For example, in certain embodiments, the effective amount of the metal sorbent is generally about 10% or less, typically about 8% or less, and usually about 5% or less by weight of the contaminated material for solids such as soil and sediment. More often, the effective amount is about 0.5% to 10%, typically about 1% to about 8%, and usually about 1% to about 5% by weight of the metal contaminated material for solids such as soil and sediment.

In as many embodiments, the effective amount for treating liquids is generally about 3% or less, typically about 2% or less, and usually about 1% or less by weight of the contaminated material for liquids such as water and leachate. More often, the effective amount is about 0.01% to 3%, typically about 0.05% to about 2%, and usually about 0.1% to about 1% by weight of the metal contaminated material for liquids such as water and leachate. It is to be understood that the application rate for treating liquids can also be calculated as the effective amount of the metal sorbent needed per gallon (or liter) of liquid treated. Whether the application rate units are weight percent or weight per gallon (or liter), the actual amount of the sorbent needed can be readily determined by standard means in the art from the metal concentration in the liquid, the metal sorbent capacity of the metal sorbent for the specific metals in the liquid, and the contact time needed to remove those metals to treatment standards.

As can be appreciated, the treating involves contacting the metal contaminated material with an effective amount of the metal sorbent. It will also be appreciated that steps (i) and (ii) are repeated one or more times, as needed, so as to support harvesting of the invasive Asian carp from the body of water.

Treatment examples of specific interest include, but are not limited to, use of the Asian carp metal sorbent in ex situ applications such as admixing metal polluted liquids with the metal sorbent by batch or continuous flow mechanisms, as well as in situ applications such as by admixing metal contaminated solids or sediments with the metal sorbent, as well as construction of a permeable reactive barrier and related methods (See, e.g., K. Bronstein (2005) "Permeable Reactive Barriers for Inorganic and Radionuclide Contamination," U.S. Environmental Protection Agency; Bortone et al. (2014) *Chemical Engineering Transactions* 36:547-552; Bostick et al. (2003) "Use of apatite for chemical stabilization of subsurface contaminants, *Final Report,*" submitted to *the* U.S. Department of Energy; and U.S. Pat. No. 6,217,775; which references are herein incorporated in their entirety.

Thus the method can be adapted in multiple configurations for mitigating the environmental impact of the invasive Asian carp, including production of a metal sorbent derived from the carp's bones, and use of the metal sorbent thus produced, so as to incentivize harvesting of a plurality of the carp from one or more bodies of water in which the carp is invasive and thereby mitigating the environmental impact of the carp.

Mitigating Invasive Asian Carp by Green and Sustainable Best Management Practice for Heavy Metal Remediation The present disclosure includes harvesting of the invasive Asian carp as an integral part of a green and sustainable best management practice for heavy metal remediation.

Green and sustainable strategies emphasize a system wide approach applied to all aspects of environmental management and/or cleanup of a site (see, e.g., USEPA (2015) "Green Remediation Best Management Practices, An Overview," EPA 542-F-16-001, December; Department of Navy (2012) *"Guidance on Green and Sustainable Remediation," April; Department of Defense* (2009) *"Consideration of GSR practices in the Defense Environmental Restoration Program," August; Interstate Technology and Research Council* (2011) "Green and Sustainable Remediation: A Practical Framework," November; and American Society for Testing and Materials (2016) "Standard Guide for Greener Cleanups," E2893-16e1). For example, specific elements recognized by the US EPA as green and sustainable include: (i) minimized total energy use and increased use of renewable energy; (ii) minimized greenhouse gas emissions and air pollutants; (iii) minimized water use and preservation of water quality; (iv) conservation of natural resources and minimized waste generation; and (v) protecting land and ecosystems. The Department of Defense (DoD), the Interstate Technology and Research Council (ITRC), and the American Society for Testing and Materials (ASTM) have also issued similar guidance and best practice documents as noted above.

The application of processed invasive Asian carp bones as described herein for the treatment and remediation of metal contaminated media provides an exceptionally green and sustainable best management practice. Specifically, the Asian carp bones are prepared for use and applied for environmental cleanup with a much lower energy input and smaller carbon footprint compared to competing technologies such as excavation and offsite disposal, in situ chemical stabilization with cement, ion exchange, or reverse osmosis, for example.

In addition to lower energy consumption and carbon dioxide emissions, recruitment overfishing for invasive Asian carp has a positive impact on ecosystem protection and restoration unmatched by any other green and/or sustainable best management practice for metal remediation. The application of Asian carp bones for metal remediation will be viewed favorably by state and federal regulators and the public who typically favor green and sustainable approaches to remediation in their communities. However, unlike other green and sustainable best management practices, the benefits extend upstream in the supply chain to communities that have been harmed by invasive Asian carp. These communities include those with economies dependent on freshwater fisheries and tourism that are threatened by the Asian carp invasion.

Accordingly, another aspect of the subject disclosure is a green and sustainable method of treating a metal contaminated material. This method includes (i) obtaining a metal sorbent comprising bone particles of Asian carp harvested from a body of water in which the carp is invasive; (ii) treating a metal contaminated material, such as soil, sediment, water, or leachate from a soil or waste site contaminated with metals, with an effective amount of the metal sorbent so as to form immobilized reaction products of the metal contaminated material and the metal sorbent; and (iii) repeating steps (i) to (ii) as needed so as to support harvesting of the carp from the body of water and remediation of the metal contaminated material.

As noted above, the effective amount is generally an application rate that reduces harmful exposure to one or more metals. While it is preferable to eliminate exposure risks, it will be appreciated that even a small reduction can represent a significant remediation achievement.

By "remediation" is intended abatement, cleanup, containment or otherwise mitigation of a hazardous substance in order to protect public health and/or the environment. For example, sorption of lead by hydroxyapatite generates immobilized reaction products with extremely low solubility and bioavailability. Remediation is therefore achieved by stabilizing the metal in the contaminated material itself, thereby significantly reducing the potential harmful effects from exposure to the untreated material.

In the context of heavy metal remediation, the effective amount, sometimes referred to as a "remediation effective amount" or "metal remediation effective amount," is an amount of a subject metal sorbent that forms immobilized reaction products of the metal contaminated material and the metal sorbent particles. As detailed above, the effective amount for treating a liquid is usually about 3% or less, and the effective amount for treating a solid is about 1% or more. A general application rate will often be about 1% to 10% by weight of the metal contaminated material, usually about 2% to 6%, and more typically about 3% to 5% by weight of the metal contaminated material.

Baseline metal sorption activity can be utilized for quality control and assurance as well as estimate more specific treatment rates for a given material. In some embodiments, the subject method further comprises measuring the metal sorption capacity of a test sample of the metal sorbent. Copper and zinc are exemplary metals for this purpose, even if a material to be treated does not contain these metals. Either of these two metals alone or in combination or even a panel of several metals can be tested. A featured aspect is where the Asian carp bone particles have a metal sorption capacity effective for treating a material contaminated with at least one metal selected from the group consisting of cadmium, copper, strontium, uranium, and zinc. A specific example is where the Asian carp bone particles have a metal sorption capacity of at least 30 milligrams of copper per gram when tested at about 1 part copper to about 25 parts sorbent at equilibrium in distilled deionized water at 25° C., such as about 40 milligrams of copper per gram sorbent when tested at an initial copper concentration of about 400 mg/L and 10 g/L sorbent at equilibrium in distilled deionized water at 25° C. An activity baseline like this provides a good indicator that the particles are suitable for treating a wide range of materials at a reasonable application rate. Maximum metal sorption capacities are also useful for this purpose.

The amount of the invasive Asian carp bone particles in the metal sorbent can vary, but is generally an amount sufficient to support harvesting of the carp from the body of water and treat the metal contaminated material. It is preferably an environmentally effective amount of the Asian carp from the body of water, and more specifically, an amount where the harvesting results in recruitment overfishing as noted above. For example, assuming the top 6-7 inches of soil of a one acre waste site (about 1,000 short tons) is treated at an application rate of 3% by weight sorbent to soil, then about 30 tons of metal sorbent is applied, which requires a corresponding harvest of about 600 tons of whole fish if the metal sorbent is composed of 100% Asian carp bone particles. Remediation of 100 acres of heavy metal contaminated soil at this rate would consume 60,000 tons of fish. This amount exceeds the long term goal of the Asian Carp Monitoring and Response Workgroup (MRWG) and the Illinois Department of Natural Resources (IL DNR) to remove 20 to 50 million pounds (10,000 to 25,000 tons) of Asian carp annually from the Illinois River Watershed (see, e.g., 2018 Asian Carp Monitoring and Response Plan, MRWG).

By "environmentally effective amount of the Asian carp" is intended an amount that reduces or otherwise mitigates the environmental impact of the invasive Asian carp on a body of water from which the carp is harvested. By "recruitment overfishing" is intended depletion of the mature adult population (spawning biomass) to a level where it no longer has the reproductive capacity to replenish itself.

In many embodiments, the amount of the invasive Asian carp bone particles in the metal sorbent is greater than 5% up to and including 100%, specified in any increment or suitable unit. The amount is generally about 10% or greater, typically about 50% or greater, usually about 80% or greater, and preferably about 90% or greater up to 100%, again, specified in any increment or suitable unit. Most often the Asian carp bone particles will comprise at least 50% by weight of the metal sorbent. Given the extremely high volumes of metal sorbent required for heavy metal remediation as noted above (e.g., about 1 pound sorbent for every 20 pounds of metal contaminated media at a 5% application rate), applying a metal sorbent that is least 50% by weight invasive Asian carp bone at a rate of 1% to 10% by weight of the metal contaminated material is capable of having a significant impact on invasive Asian carp populations, including, but not limited to, recruitment overfishing of the carp in a body of water from which the carp is harvested.

It will also be appreciated as noted above that the metal sorbent can include metal sorbent particles derived from at least one fish other than Asian carp, for example, catfish, tilapia, or from other sources such as APATITE II material, and so forth as noted above. As also noted above, the metal sorbent in many embodiments is substantially devoid of a foul fish odor, and may include uncharred Asian carp bone particles retaining residual organics, charred Asian carp bone particles and little to no residual organics, or a blend of the uncharred and charred bone particles. Blends find particular use for reducing the application rates when desired, as the charred material can increase metal binding capacity for several metals as demonstrated in the examples.

Another aspect of the subject disclosure is certifying that the metal sorbent product includes invasive Asian carp so as to induce its procurement. By "certifying" is intended the action or process of determining, assessing, verifying or otherwise confirming something to be true. For example, product certification is necessary to leverage the significant purchasing power of state and federal governments by meeting statutory and regulatory obligations such as found under the Pollution Prevention Act, which was promulgated in part to identify opportunities to use governmental procurement for maximizing the utilization of environmentally preferable products and services.

In certain embodiments, the methods of the disclosure include certifying the presence of the invasive Asian carp in the metal sorbent, where the certification meets qualification criteria (such as stipulated in various contracts, regulations, or specifications) for best management practices in reducing heavy metal contamination and the environmental impact of the invasive Asian carp.

A related embodiment is certifying the presence of the invasive Asian carp in association with the container in which the metal sorbent is stored, the certifying comprising packaging the metal sorbent in a suitable container for keeping the metal sorbent dry and certifying the invasive Asian carp and metal sorption capacity as present in the container. This later aspect is important as the metal sorption capacity, organic content and odor of the invasive Asian carp material depends in large part on how the material is stored, as demonstrated in the working examples that follow.

The certifying is generally carried out on a test sample of the metal sorbent, such as by measuring or otherwise detecting, determining or assessing the invasive Asian carp material in a representative sample. For example, testing for the presence of invasive Asian carp in a sample can be done by any number of forensic techniques known in the art. In general, biological identification systems that are fast, accurate, reliable, and easy to use are of interest (e.g., In Didier, M. & Ray, R. C. (2017) Food traceability and authenticity analytical techniques; Montet, D. and G. Dey (2018) History of food traceability; Mustafa et al. (2018) *Foods* 7 (10): 168; and Giovanni, R. (2017) *Sensors* 17:1453). Mobile systems for biologics identification and/or quantification are examples. This includes, but is not limited to, lab-on-chip, portable systems for biodetection and analysis employing detection techniques such as nucleic acid sequencing, optical systems, mass spectrometry and so forth. Of particular interest is certifying the presence of the invasive Asian carp through nucleic acid analysis (e.g., DNA sequencing). The certification feature also aids in monitoring and tracking the invasive Asian carp to further help reduce the environmental impact of the carp.

Product certification also relates to quality control and direct action by the end user given the potential for supply chain variance related to watershed diversity from which the invasive Asian carp is harvested. For example, fish harvested in clean verses contaminated waterways often exhibit variable levels of heavy metals depending on feeding and exposure history (Derakhshan et al. (2018) *Data in Brief* 21:1890-1894). This potential for variability can change the lot to lot metal sorption capacity and binding profile, making certifying metal sorption capacity through representative sample testing a specific feature of interest.

The following examples further illustrate the present invention and should not be construed as in any way limiting its scope.

EXPERIMENTAL

Example 1: Defleshed Asian Carp Bone

Fresh frozen silver carp carcasses (fillets, organs, and skin removed) were obtained from Schafer Fisheries, Inc., Thomson, Illinois. Fish lengths ranged from 400 to 1,000 millimeters. The carcasses were thawed and then pressure cooked for about 5 minutes at 15 pounds per square inch and 121° C. The excess flesh and fat materials were either removed by hand from the steamed carcasses, or the steamed carcasses were placed on a screen and the excess flesh and fat materials removed with a high pressure air compressor. The defleshed bones were then rinsed with water. The defleshed bones were then dried and milled as described in Examples 2 and 3 below.

Example 2: Uncharred Asian Carp Bone Particles

The defleshed fish bones as prepared in Example 1 were dried and heated in an air oven (Quincy Lab Inc., Model 40 GC Lab Oven) at 120° C. for 1 hour to water dryness, resulting in about 5% or less moisture content by weight. Defleshed fish bones were also dried at 103° C. for 1 hour to water dryness with similar results. Care was taken during this heating step so as to retain associated organics and not to char the bones. It was found that drying under these conditions had the added benefit of removing a foul fish odor such as found with the dry APATITE II product. The dried fish bones (referred to herein as "120 carp") were then milled in a blender (Hamilton Beach Model 50166 set on high) to generate a coarse milled mixture of metal sorbent particles having a few 0.5 to 2 centimeter pieces, but mostly in the range of about 4 to 40 mesh (or particle diameters of about 5 millimeters down to about 400 microns, respectively), with average mesh of about 20 (or an average particle diameter of about 840 microns). A portion of the ground 120 carp bone material was stored for later testing, while another portion was subjected to further heat treatment for charring as described in greater detail below. Visually, the uncharred 120 carp material retained a natural bone color or otherwise cream or off white color. It was found that heating the fish bones to water dryness followed by grinding worked well, since the dried bones were much more brittle and determined to break-up better upon grinding.

Example 3: Charred Asian Carp Bone Particles

The uncharred Asian carp bone particles prepared in Example 2 above were subjected to heating for the purpose of removing any residual moisture and converting associated organics to provide charring. Specifically, approximately one half of the milled 120 carp bone material from Example 2 was heated in an air oven (Ney Vulcan Model D-550) at a temperature of 485° C. for 1 hour so as to char the material. The charred fish bones (referred to herein as "485 carp") were blackened throughout.

Example 4: Mixed Metal Sorption Analysis

A mixed metal batch test was performed to assess which if any of several typical priority metals were removed from a standard solution by contact with the Asian carp bone test articles prepared as above. APATITE II, which is a PIMS NW, Inc. (U.S.A.) fish bone metal sorbent product and currently the industry gold standard, was employed as a control for comparison. All chemicals were reagent grade unless otherwise indicated, and purchased from Thermo Fisher Scientific and Millipore Sigma Corporation.

Removal of dissolved metals was evaluated at equilibrium in a standard solution of about 2 grams of the coarse milled mixture of the fish bone test articles admixed with about 0.025 grams of a metal present as a suitable salt in about 0.25 liters of deionized water (concentration equals 100 milligrams of metal per liter) at 22° C. with constant stirring for 16 hours. The solution was analyzed by a commercial analytical laboratory using an inductively coupled argon plasma-mass spectrometer operated in accordance with United States Environmental Protection Agency Method 6020A. The mixed-metal batch test was performed with the following metals: lead (Pb), nickel (Ni), strontium (Sr), copper (Cu), and cadmium (Cd). The following salts of these metals were employed: cadmium chloride ($CdCl_2$), copper sulfate ($CuSO_4$), nickel sulfate ($NiSO_4 6H_2O$), lead chloride ($PbCl_2$), and strontium chloride ($SrCl_2$). The mixed-metal batch test results are depicted in Table 1 and Table 2.

As can be seen from Table 1, the initial metal concentration "Co" reports the original metal stock solution concentration in milligrams per liter (mg/L), and the final metal concentration "Ce" reports the metal concentration in milligrams per liter (mg/L) detected in the solution at equilibrium. It can be further seen in Table 1 that a non-saturating concentration of metal (about 100 milligrams per liter or less) was employed with a high amount (8 grams per liter) of the fish bone test articles. While the lead and strontium results were impacted by the poor solubility of their sulfate salts in water (see control), sorption of these metals by the fish bone test articles was nonetheless indicated.

TABLE 1

Mixed metal concentrations in solution before (Co) and after (Ce) treatment

| Metal | Co (mg/L) | APATITE II Ce (mg/L) | 120 carp Ce (mg/L) | 485 carp Ce (mg/L) |
|---|---|---|---|---|
| Cadmium | 92.0 | 6.0 | 6.0 | 1.1 |
| Copper | 91.0 | 4.1 | 10.8 | 0.9 |
| Nickel | 94.0 | 50.0 | 58.5 | 17.0 |
| Lead | 2.3 | *0.0 | *0.0 | *0.0 |
| Strontium | 40.0 | 25.0 | 25.5 | 29.5 |

*limit of detection, estimated value

Also note that the data shown in Table 1 and Table 2 indicate that both the uncharred 120 carp and charred 485 carp bone particles performed extremely well in this metal sorption screening.

TABLE 2

Mixed metal removal

| Metal | APATITE II % metal removed | 120 carp % metal removed | 485 carp % metal removed |
|---|---|---|---|
| Cadmium | 93% | 93% | 99% |
| Copper | 95% | 88% | 99% |
| Nickel | 47% | 38% | 82% |
| Lead | 98% | 100% | 99% |
| Strontium | 38% | 36% | 26% |

Example 5: Single Metal Sorption Capacity Analysis

A series of single metal batch-tests were performed to assess metal sorption capacities at equilibrium for the Asian carp bone particles prepared as above. APATITE II was employed as a control for comparison. Metal sorption capacities were determined and calculated as follows:

$$S = (Co - Ce) * V/W \quad (1)$$

where S is the metal sorption capacity in milligrams of metal per gram of sorbent (mg/g). Co is the initial concentration of metal ions in milligrams per liter (mg/L) and Ce is the metal ion concentration in milligrams per liter (mg/L) at equilibrium. V is the volume of the metal ion solution liters (L) and W is the weight of the bone particles in grams (g).

Removal of dissolved metals was evaluated at equilibrium in a standard solution of about 0.5 grams of the coarse milled mixture of the fish bone test articles admixed with about 0.25 grams of metal supplied as a suitable salt of a subject metal in about 0.25 liters of deionized water at 25° C. with constant stirring for 16 hours and analysis by USEPA Method 6020A.

The single metal batch tests were performed with the following metals: nickel, strontium, molybdenum (Mo), copper, cadmium, manganese (Mn), and zinc (Zn). The following salts of these metals were tested: nickel sulfate ($NiSO_4 6H_2O$), strontium chloride ($SrCl_2$), sodium molybdate dihydrate ($Na_2MO_4 2H_2O$), copper sulfate ($CuSO_4$), cadmium chloride ($CdCl_2$), manganese sulfate monohydrate ($MnSO_4\text{-}1_2O$), and zinc sulfate heptahydrate ($ZnSO_4 7H_2O$). All chemicals were reagent grade unless otherwise indicated, and purchased from Thermo Fisher or Millipore- Sigma. The results are depicted in Tables 3 through Table 4, where the abbreviations are as defined above.

TABLE 3

Single metal concentrations in solution before (Co) and after (Ce) treatment

| Metal | Metal Co (mg/L) | APATITE II Ce (mg/L) | 120 carp Ce (mg/L) | 485 carp Ce (mg/L) |
|---|---|---|---|---|
| Nickel | 830 | 830 | 820 | 740 |
| Strontium | 870 | 820 | 770 | 770 |
| Molybdenum | 980 | 1000 | 960 | 990 |
| Copper | 910 | 770 | 840 | 670 |
| Cadmium | 940 | 840 | 840 | 660 |
| Manganese | 970 | 930 | 940 | 860 |
| Zinc | 990 | 820 | 860 | 750 |

As can be seen from Table 3, a saturating concentration of metal was employed so as to examine maximum metal sorption to the fish bone derived test articles under these conditions. Molybdenum was not removed from solution by any of the sorbents which was expected since molybdenum was supplied as an anion. The anionic molybdenum (molybdate) data in Table 3 further indicates a certain amount of error in the analysis of about plus or minus 40 milligrams per liter (mg/L).

It should be noted that while selection of appropriate metal to sorbent ratios for sorption treatment depends on the distribution coefficient Kd and the relative degree of adsorption desired, a higher Kd generally means that more metal is removed than remains in solution. For example, the distribution coefficient, Kd, is calculated by the relationship $Kd=S/Ce$, where S and Ce are as defined above. As such, low Kd's were expected when employing saturating levels of metal with relatively low levels of sorbent in the single metal studies in this example. This was in fact observed, as further illustrated in the Table 4 data, which reports on the percent metal removal under saturating metal, non-saturating sorbent conditions.

TABLE 4

Single metal removal

| Metal | APATITE II % metal removed | 120 carp % metal removed | 485 carp % metal removed |
|---|---|---|---|
| Nickel | 0% | 1% | 11% |
| Strontium | 6% | 11% | 11% |
| Molybdenum | NA | NA | NA |
| Copper | 15% | 8% | 26% |
| Cadmium | 11% | 11% | 30% |
| Manganese | 4% | 3% | 11% |
| Zinc | 17% | 13% | 24% |

* NA = not applicable; molybdenum was supplied as molybdate anion and did not bind to any of the fish bone particles as expected and in contrast to the other cationic metals.

The metal sorption capacity "S" for each of the fish bone derived test articles is reported in Table 5 in milligrams of metal per gram of sorbent, or simply S (mg/g).

TABLE 5

Single metal sorption capacity

| Metal | APATITE II S (mg/g) | 120 carp S (mg/g) | 485 carp S (mg/g) | 485WA carp S (mg/g) |
|---|---|---|---|---|
| Nickel | 0 | 5 | 45 | 29 |
| Strontium | 25 | 50 | 50 | 32 |
| Molybdenum | NA | NA | NA | NA |
| Copper | 70 | 35 | 120 | 77 |
| Cadmium | 50 | 50 | 140 | 90 |
| Manganese | 20 | 15 | 55 | 35 |
| Zinc | 85 | 65 | 120 | 77 |

* NA=not applicable; molybdenum was supplied as molybdate anion and did not bind to any of the fish bone particles as expected and in contrast to the other cationic metals.

In addition to reporting the metal sorption capacity of the APATITE II, 120 carp and 485 carp test articles, Table 5 also shows the weight-adjusted metal sorption capacity for the 485 carp material, designated "485WA carp." The weight adjustment experiment was carried out to examine whether changes in metal sorption was simply due to a concentrating effect from elimination of residual moisture and other volatiles when heating the 120 material to make the 485 carp material. In other words, when comparing the same amounts of the uncharred and charred carp bone materials, increased (or decreased) metal sorption activity due to concentrating versus other physical-chemical effects could be assessed.

For the weight adjustment experiment, a test sample of the uncharred 120 carp material weighed 10.03 grams, whereas after charring at 485° C. for 1 hour it weighed 6.42 grams. This represented a weight loss of 3.61 grams, or a 36% reduction in weight. Accordingly, to account for an activity concentration effect when comparing equal amounts of the 120 and 485 carp materials, the 485 carp S (mg/g) value is reduced by 36% to obtain the so called "weight adjusted" 485WA carp S (mg/g) value. The weight loss results are depicted in Table 6.

TABLE 6

Weight loss on charring

| 120 carp (g) | * 120 carp after charring (g) | Weight loss (g) | % Weight loss |
|---|---|---|---|
| 10.03 | 6.42 | 3.61 | 36% |

*120 carp after charring = 485 carp

As can be seen from the data reported in Table 5 and Table 6, an increase in metal sorption capacity for the 485 carp material relative to the 120 carp material was observed for nickel, copper, cadmium, manganese, and zinc even after adjusting for a weight loss effect due to charring, whereas a slight decrease or no significant change (within an error of plus or minus 10 mg/g) was observed for strontium and molybdenum, respectively. As can also be seen from the data reported in Table 5 and Table 6, an increase in metal sorption capacity for the 485 carp material relative to APATITE II was observed for nickel, cadmium, and manganese, even after adjusting for a weight loss effect due to charring, whereas no significant change (within an error of plus or minus 10 mg/g) was observed for strontium, molybdenum, copper and zinc. These data demonstrate that while some metal sorption properties are similar, there are significant physical-chemical differences between the APATITE II fish bone particle product and the Asian carp metal sorbent described herein.

When comparing relative differences in metal binding capacities between APATITE II and the 120 and 485 carp products, both of the Asian carp materials were found to outperform APATITE II for several metals under the experimental conditions tested. For example, as shown in Table 5, metal sorption activity of the 120 and 485 carp materials were similar to APATITE II for molybdenum and zinc, but an order of magnitude or better for nickel sorption relative to APATITE II, and about two times better for the sorption of strontium relative to APATITE II. The charred 485 carp material was also found to exhibit about two to three times the metal sorption capacity against cadmium and manganese, and possibly slightly better copper sorption, relative to APATITE II.

Example 6: EPA Compliant Metal Analyses

Additional single metal analysis methods were employed using United States (US) Environmental Protection Agency (EPA) compliant and commercially available kits from the Hach Company (Loveland, CO 80539; www.hach.com) following the manufacturer's instructions for: zinc detection (HACH kit Powder Pillows, Zincon (8009) method, measuring range 0.013.00 mg/L, 3% precision); nickel detection (HACH kit TNTplus 856, dimethylglyoxime (10220) method, measuring range 0.1-6.9 mg/L); copper detection (HACH kit Powder Pillows, bicinchoninate (8506) method, measuring range 0.04-5.00 mg/L, 3% precision); cadmium detection (HACH kit Powder Pillows, Cadion (10217) method, measuring range 0.020.30 mg/L); and lead detection (HACH kit TNTplus 850, PAR (10216) method, measuring range 0.1-2.0 mg/L).

Metal stock solutions were made from American Chemical Society (ACS) grade metal salts in deionized water: chromium (potassium dichromate, $Cr_2K_2O_7$), nickel (nickel sulfate, $NiSO_4*6H_2O$), copper (copper sulfate, $CuSO_4$), cadmium (cadmium chloride, $CdCl_2$), zinc (zinc sulfate, $ZnSO_4*7H_2O$), and lead (lead nitrate, $Pb(NO_3)_2$). The stock solutions were divided between negative controls, which received no fish bone sorbent material, and experimental treatments that received a given sorbent test article. Negative control and experimental treatments were incubated for the same length of time to account for any reduction in metal concentration from precipitation not mediated by the sorbent.

Both the negative controls and experimental treatments were incubated on a rotator at approximately 1.2 revolutions per minute for least 24 hours to reach equilibrium. This rotation speed was used for all metal uptake experiments. At the end of the experiment, the samples were passed through a 0.45 micrometer (pm) filter. For zinc, copper, and nickel, experimental tubes were centrifuged prior to filtration. After solids were removed by filtration, the test samples were diluted and the pH adjusted to be within the measuring range of a given HACH test kit as needed. Preparation of test solutions in deionized water without other metals provided near ideal measurement conditions for the HACH procedures.

Lead testing was modified to avoid carbonate formation in the test solution upon exposure to atmosphere, which drops lead concentrations below the detection level of the HACH kit for the negative controls, preventing quantification of lead removal by a given sorbent. Specifically, carbonate was removed from the lead stock solution by purging the deionized water with nitrogen gas before adding the lead salt. A rubber stopper with a gas inlet and outlet sealed the flask containing deionized water. Before adding 0.9 g lead nitrate powder, 250 ml deionized water in a 500 mL bottle was deoxygenated by sparging with approximately 6 L of nitrogen at 5 standard cubic feet per hour for 2.5 minutes. The rubber stopper was lifted to allow the lead nitrate powder to be added. The resulting solution was sparged again as above. This stock solution was added with a syringe and hypodermic needle through the silicone septum of 40 ml vials containing nitrogen gas purged deionized water with and without bones to yield the desired lead concentration. The vials were placed on a rotator for at least 24 hours. At the end of the experiment, 5 ml samples were taken with a nitrogen gas purged syringe, filtered with a 0.45 pm-filter, and collected in a clean polypropylene tube. Samples were immediately diluted with deionized water and measured with the HACH Lead TNTplus 850 analytical chemistry kit.

Analysis included isotherm modeling using the Freundlich equation $S=Kf*Ce^{(1/n)}$ where: S is the amount of metal absorbed per unit mass of sorbent at equilibrium; Kf is the Freundlich equilibrium constant; 1/n is a constant indicating adsorption intensity or strength; and Ce is the equilibrium concentration or total amount of metal remaining in solution as defined above. If (1/n) approaches 1 the equation is linear and Kf approaches equality to the distribution coefficient, Kd, as defined above. For non-linear isotherms the data can be plotted in linear form by taking the log of both sides of the equation. Plotting log S versus log Ce provides an estimate of the binding strength (1/n, unitless) and distribution (Kf, mg metal per gram sorbent) of a sorbent for a given metal under the conditions tested.

The results are described in Examples 8 to 10 and 12 that follow.

Example 7: Uncharred and Charred Asian Carp Bone Particles Prepared with Fresh Bone Grinding Before Heating Additional 120 and 485 carp material were prepared as in Examples 1-3 with the following modifications. Fresh defleshed carp bones prepared according to Example 1 were stored at −20° C. for later processing. The defleshed bones were further processed by removing them from the freezer and washing twice in hot water. The washed bones were caught on a mesh screen and transferred to a Hamilton Beach Blender (Model 50167), approximately 1 cup at a time, where they were ground for 1 minute (min) on the "ice-breaker (pulse)" setting. Bone fragments were transferred to pre-weighed aluminum baking trays and the wet mass of the bones recorded. The wet bone fragments were then baked 2 or 3 hours at 120° C. after which the dry mass was recorded and the percent water loss calculated. The average weight loss to full dryness was found to be approximately 33% with most of the water loss occurring within the first 30 minutes. The dried bone fragments were passed through a colander with holes 17/64 inches in diameter, stored in a glass jar, and designated "120 carp" material. The few pieces too large to pass through the colander were discarded. The 120 carp material was then allowed to re-equilibrate with atmospheric moisture (humidity) overnight, and found to re-adsorb approximately 26% moisture by weight. As shown below, the residual moisture content did not affect the performance of the 120 carp material. Additional 485 carp material was prepared from this 120 carp material following the protocol described in Example 3.

Example 8: Shelf Life and Batch Variance

To test whether the bone materials become less effective for metal sorption after long-term storage or exhibit batch production variance, 120 carp material was prepared fresh ("fresh 120 carp") according to Example 7 and compared to: (i) an older batch of 120 carp ("old 120 carp") as prepared in Examples 1 and 2; (ii) an older batch of APATITE II ("old APATITE II"); (iii) a re-baked version of old 120 carp ("re-baked 120 carp") reheated at 120° C. for 2 hours; and (iv) a re-baked version of old APATITE II ("re-baked APATITE II") reheated at 120° C. for 2 hours. The old 120 carp material was stored in a Ziplock™ bag (dry) in the dark at room temperature for greater than 6 months. The old APATITE II was stored inside a plastic bag in a small plastic bucket with lid under the same conditions for greater than 6 months as well.

Zinc was selected as the metal for testing if any change in metal binding had occurred due to sample age or batch production variance. Metal measurement was performed with a commercial HACH zinc detection kit and Zincon method 8009 (see Example 6) as follows. A 250 mg/L stock solution of zinc sulfate ($ZnSO_4$*7 $H_2O$, ACS grade) was prepared in deionized water, and a portion kept as a negative control. Approximately 1.26 g of a given fish bone sorbent material were added to 50 ml of the stock solution of zinc sulfate to give a final reaction mixture having 25.2 g/L sorbent and 250 mg/L zinc sulfate (or about 1 part metal to 100 parts sorbent). Negative controls contained only stock zinc sulfate solution, but no sorbent. The test and control samples were incubated for 65.5 hours on a rotator. At the end of the experiment, samples were centrifuged and filtered through a 0.45 µm filter. The pH in this, and all other experiments, was measured in a single sample from each treatment group with an Accumet pH meter XL15 and Pencil-Thin Electrode. The filtered samples were acidified using 0.86% nitric acid to a pH of 4-5. Samples were then diluted to be within the HACH kit measuring range for zinc (0.01-3.00 mg/L). Samples were re-adjusted as needed to a pH of 4-5 using 0.86% nitric acid and 0.1 Molar (M) sodium hydroxide (NaOH). Samples that could not be processed immediately were stored overnight at 4° C. and returned to room temperature the following day before measurement.

All test samples showed similar activity, removing just over 9 milligrams of zinc per gram of a given fish bone sorbent from a reaction mixture containing about 1 part metal to 100 parts sorbent (data not shown). These data demonstrate that the 120 carp and APATITE II fish bone sorbents retain their metal sorption capacity over time under typical storage conditions. The data also show that different batches of the 120 carp sorbent with rigorous processing variations still behave the same and thus exhibit batch to batch reproducibility and scale up feasibility.

Example 9: Single Metal Sorption Under Non-Saturating Metal Concentrations

The 120 carp material prepared according to Example 7 was further compared to APATITE II against various dissolved metals in addition to zinc and at different metal to bone mass ratios for selected metals as follows. 0.5 g of either 120 carp or APATITE II were added to each metal solution, except for the nickel experiments, which received 0.8 g bones, and the zinc experiment, which used 0.63 g. Experiments were incubated at least 24 hours in a metal solution volume of 40 ml except for copper, which were incubated in 50 ml. In order to examine non-saturating single metal sorption behavior, initial metal to sorbent ratios were set at several orders of magnitude less than those in Example 5.

Metal measurement was carried out for nickel, zinc, copper, and lead using the relevant commercial HACH kits according to the manufacturer's instructions (see Example 6). Briefly, after solids were removed by filtration, samples were diluted and the pH adjusted to be within the measuring range of a given HACH test kit. The results are reported in Table 7, where Co refers to the initial dissolved metal concentration, Sorbent refers to the amount of a given fish bone sorbent material in milligrams per liter, and S refers to the metal sorption in milligrams of metal per gram of sorbent.

Representative results are provided in Table 7 for nickel and zinc at a ratio of about 1 part metal to 70 parts sorbent, and for copper and lead at about 1 part metal to 25 parts sorbent. As can be seen from Table 7, metal sorption by the 120 carp sorbent was similar to APATITE II for nickel and zinc under these non-saturating metal conditions.

TABLE 7

Single metal sorption at non-saturating metal concentrations

| Metal | Co (mg/L) | Sorbent (g/L) | S (mg/g) APATITE II | S (mg/g) 120 carp |
|---|---|---|---|---|
| Nickel | 260 | 20.0 | 7.6 | 5.5 |
| Zinc | 260 | 15.8 | 9.3 | 9.1 |
| Copper | 413 | 10.0 | 40.5 | 40.0 |
| Lead | 486.5 | 12.5 | 37.2 | 37.2 |

Additional testing indicated that for copper, holding the sorbent constant at 10 g/L while approximately halving the initial copper concentration from 413 to 197 mg/L resulted in an decrease in metal sorption from about 40 to 16 mg/g for both 120 carp and APATITE II. This particular copper experiment showed that neither of the two sorbent materials was saturated with copper under these conditions (1 part metal to about 25-85 parts sorbent). Conversely, a roughly doubling of the initial lead concentration from 486.5 up to 946 mg/L resulted in a drop in metal sorption from 38 mg/g to around 29 mg/g for both 120 carp and APATITE II, indicating sorption had begun to saturate around these two conditions for lead (1 part metal to about 10 to 30 parts sorbent).

These data show that under non-saturating metal conditions, metal sorption by 120 carp is similar to APATITE II for nickel, zinc, copper and lead.

Example 10: Maximum Single Metal Sorption Capacities

The single metal sorption capacities observed under saturating (Example 5) and non-saturating (Examples 4 and 9) metal concentrations indicated that the 120 carp sorbent should exhibit maximum sorption capacities that vary for different metals. As such, a range of metal concentrations, sorbent masses, and incubation times were tested to determine the maximum sorption capacities of the 120 carp material for nickel, copper, zinc, cadmium and lead. The tests were carried out according to Example 6. The results are reported in FIG. 1 (error bars are standard error of replicates with some error too small for display) and Table 8.

Figure 1:
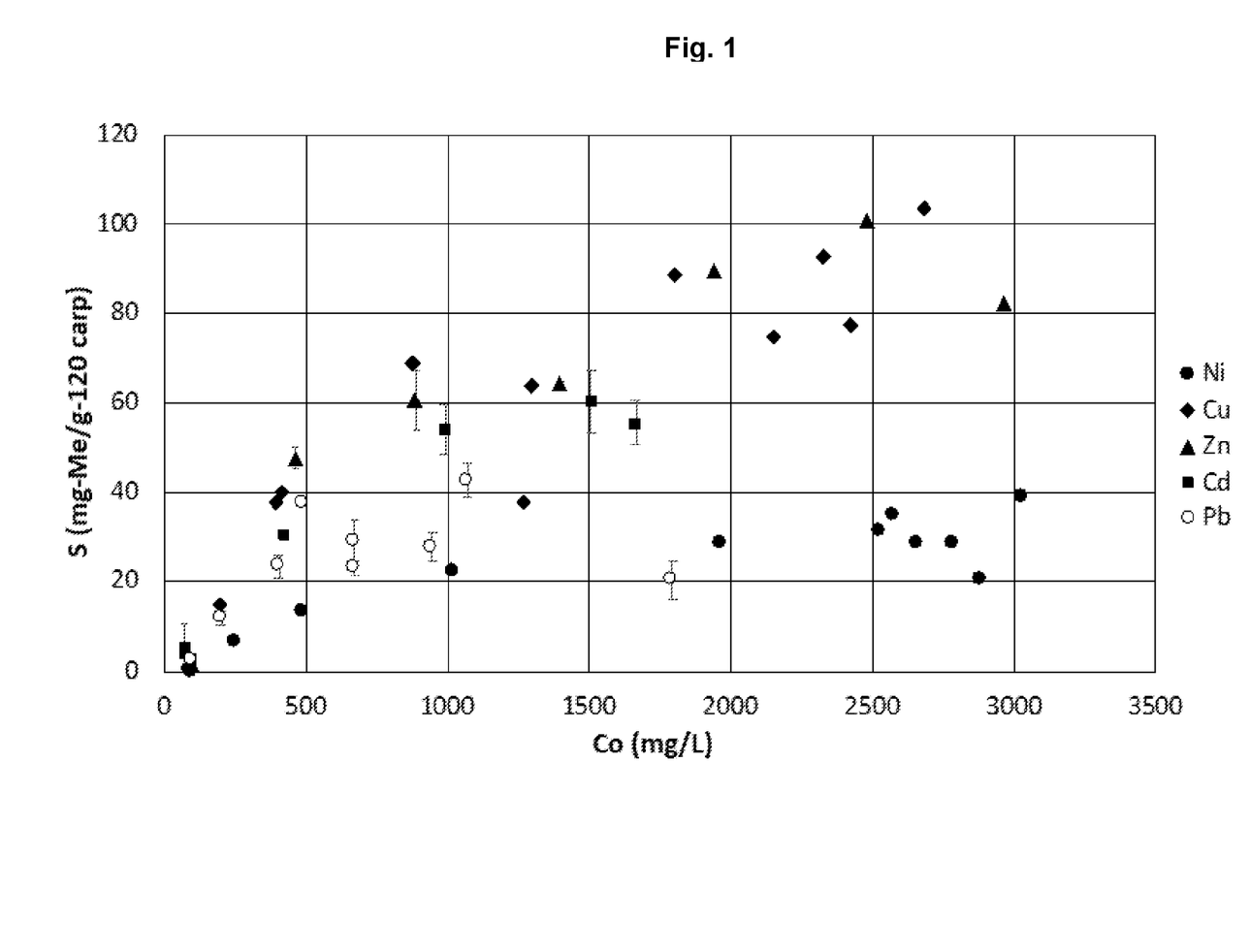
FIG. 1 is a plot summarizing metal uptake by an exemplary metal sorbent produced from Asian carp bones ("120 carp") depicted as sorption capacity (S, in milligrams of metal per gram of sorbent) versus initial metal concentration (Co, in milligrams per liter). Ni is nickel, Cu is copper, Zn is zinc, Cd is cadmium, and Pb is lead.

As can be seen in FIG. 1, the 120 carp material exhibited remarkable metal uptake activity against all of the metals tested. It can also be seen that as the initial metal concentration increases, sorption begins to stabilize, become variable, or decrease depending on the metal, which is consistent with the saturating metal test in Example 5, and the non-saturating metal tests of Examples 4 and 9.

Table 8 summarizes change trends observed in FIG. 1 modeled using the two-parameter Freundlich isotherm equation and linear regression, where Kf and 1/n are as described above in Example 6; and $R^2$ is the goodness of fit measure for linear regression. The maximum sorption capacities (Smax) are also reported in Table 8, where Smax is a conservative estimate of the maximum sorption capacity based on the highest sorption capacity measured on the metal saturation curves of FIG. 1 before the curves begin to stabilize, become variable or decrease.

TABLE 8

Summary of metal sorption by 120 carp

| Metal | Kf (g/g) | 1/n | $R^2$ | Smax (mg/g) |
|---|---|---|---|---|
| Nickel | 0.775 | 0.492 | 0.953 | 39 |
| Copper | 0.244 | 0.858 | 0.858 | ≥103 |
| Zinc | 0.579 | 0.292 | 0.873 | 101 |
| Cadmium | 0.085 | 0.149 | 0.615 | 60 |
| Lead | 0.209 | 0.792 | 0.792 | 43 |

The results in Table 8 show that the 120 carp material had the highest sorption capacity for copper and zinc, and the lowest for nickel. The results also reveal that the relative binding strength (1/n) was highest for copper and lead, and lowest for cadmium. However, cadmium removal was not well modeled by the Freundlich equation under the test conditions, although the maximum observed cadmium removal from solution was still more than 98% or 60 milligrams of cadmium per gram of the 120 carp sorbent.

Example 11: Mixed Metal Sorption and pH

The uncharred Asian carp bone particles (120 carp) prepared according to Example 7 above were tested along a pH series for selected metals as follows. The 120 carp sorbent was added to a metal salt solution containing an initial concentration of about 100 mg/L for cadmium, copper, nickel and zinc, and about 200 mg/L for chromium. Solution pH was adjusted per test kit manufacturer's instructions using 0.1 M NaOH or 0.86% nitric acid. Concentrations for individual metals were non-saturating for the 120 carp mass applied. Incubations were performed in 250 ml of a given metal solution with 20 g of the 120 carp material. The samples were then outsourced for commercial testing (Eurofins TestAmerica, https://www.testamericainc.com/). Representative results are depicted in Table 9, which summarizes the ability of 120 carp material to remove metal from a mixed-metal solution along a pH series.

TABLE 9

Single metal sorption along a pH series

| | S (mg/g) for 120 carp material | | | |
|---|---|---|---|---|
| Metal | pH 3 | pH 5 | pH 7 | pH 9 |
| Cadmium | 1.20 | 1.14 | 1.12 | 0.04 |
| Zinc | 1.19 | 1.18 | 1.00 | −0.01 |
| Copper | 1.15 | 1.21 | −0.02 | −0.08 |
| Nickel | 0.85 | 1.00 | 0.79 | −0.24 |
| Chromium | 0.55 | 0.82 | 0.19 | −0.38 |

The results in Table 9 illustrate that metal sorption was highest under the acidic conditions and lowest under the basic conditions.

Example 12: Metal Sorption Rate

Figure 2:
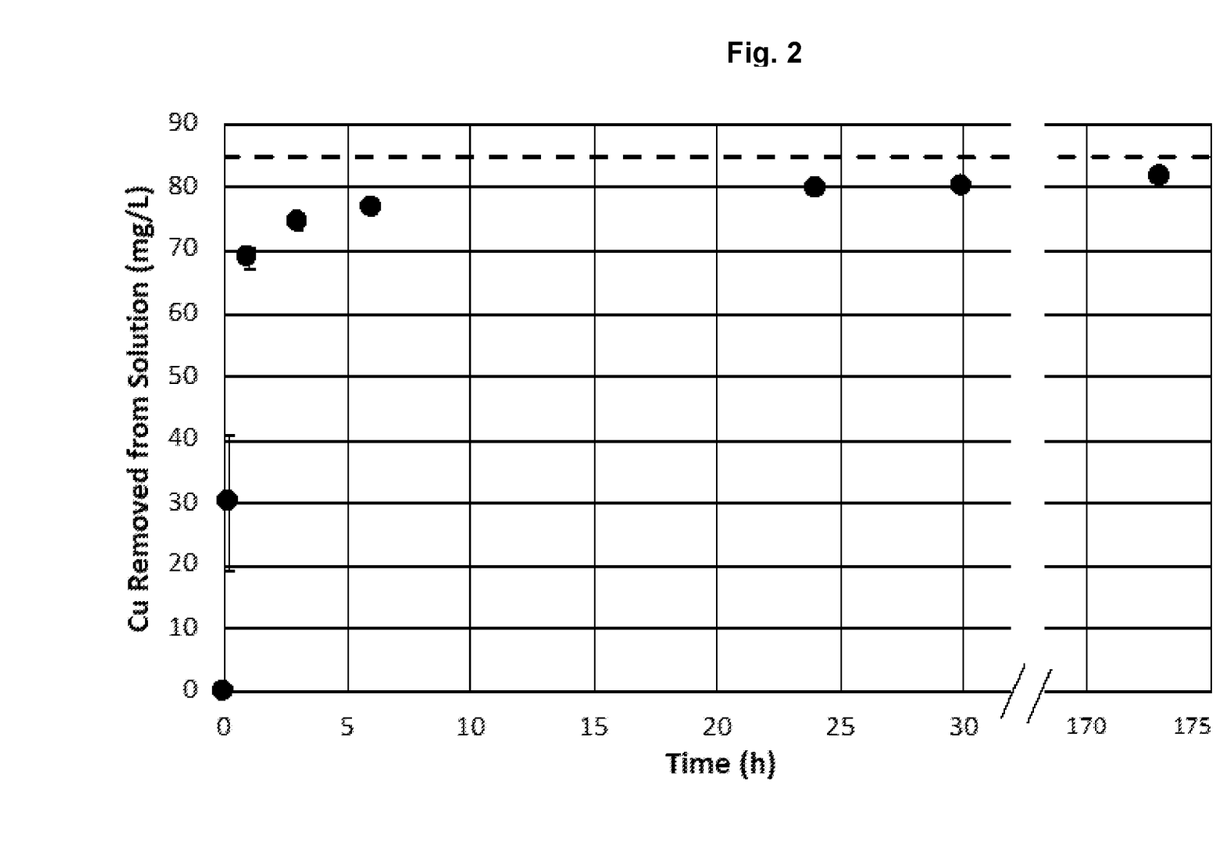
FIG. 2 is a plot illustrating copper removal from solution by the metal sorbent "120 carp" and depicted as amount of copper removed versus time (in hours) from a solution with a starting concentration of 85 milligrams per liter.

Copper sorption by the 120 carp material prepared in Example 7 was measured over time under non-saturating conditions according to Example 6 using 7 g of the 120 carp material in a volume of 45 ml of a 85 mg/L stock copper solution (1 part metal to about 1750 parts sorbent). The results are depicted in FIG. 2 (error bars are standard error from an experimental triplicate; some error bars are too small for display). The reaction largely occurred within the first few hours hour of incubation (88% removal of copper from solution after three hours), reaching a metal sorption of 0.44 mg of metal per gram of the 120 carp material. The final percent removed observed after 173 hours of reaction was 96%; a corresponding analysis of concentration with time shows a constant equilibrium concentration between sorbed and soluble metal will be established (data not shown).

Example 13: Uranium Sorption 120 carp material as prepared in Example 7 was sieved to between 0.85 millimeter (mm) and 2.36 mm, and 0.104 grams of the sieved material incubated in 45 milliliters of a 838 mg/L uranium solution prepared from uranyl nitrate hydrate in deionized water on a 30 revolution per minute rotary tumbler for 44 hours. At the end of the incubation, the treatment was filtered through a Whatman 40 filter, removing particles larger than 20-25 µm. The equilibrium uranium concentration was measured by Inductively-Coupled Plasma excitation with optical emission spectroscopy (ICP-OES). The initial and final pH of the uranium and 120 carp material solution were also monitored. The results of this experiment depicted in Table 10 show that the 120 carp material exhibited strong activity toward uranium, removing 260 mg of the metal per gram of the sorbent from a solution with an initial uranium concentration of 838 mg/L. As with the other metals, uptake decreased in proportion to lower starting concentrations of uranium. At slightly acidic pH and a relatively high starting concentration, 120 carp removed more uranium per gram than observed for any other metal.

TABLE 10

Uranium sorption by 120 carp material

| Co (mg/L) | Ce (mg/L) | Sorbent (g/L) | Initial pH | Final pH | S (mg/g) |
|---|---|---|---|---|---|
| 838 | 235 | 2.31 | 5.25 | 5.38 | 260 |

Example 14: Organic Content and Odor Upon Re-Drying and Re-Hydration

APATITE II as received from the manufacturer was compared to the 120 carp and the 485 carp materials as prepared in Example 7 for differences in odor upon re-drying and re-hydration. The results are reported in Table 11.

TABLE 11

Odor upon re-drying and rehydration

|  | Stock | Re-dried at 100° C. | Rehydrated |
| --- | --- | --- | --- |
| 120 carp | Mild grassy odor almost like green tea leaves, not unpleasant | No change in odor | Stronger fish smell than dry 120 carp, but not rotten and distinctly less odor and less offensive than wet APATITE II |
| APATITE II | Unpleasant and distinctly fishy/shellfish odor, and a much stronger odor than 120 carp | Similar but slightly less odor than the as received APATITE II | Strong, meaty, rotten fish odor, unpleasant, noticeably stronger than wet 120 carp |
| 485 carp | Dry, no odor | Not applicable | Mild wet charcoal/campfire odor |

APATITE II was estimated to contain about 27% to 34% organic content based on loss upon ignition analysis (LOI, %=100×[Weight@105° C.-Weight@400° C.]/Weight@105° C., Bostick, 2003). From the current studies, the 120 carp material was found to contain about 36% organic content (Table 6, LOI, %=100×[Weight@120° C.-Weight@485° C.]/Weight@120° C.). Even though the 120 carp material was determined to contain similar or more organic content than APATITE II, it smelled significantly better, whether comparing stock, re-dried at 100° C., or the rehydrated after drying material (Table 11). Also, unlike APATITE II that requires charring to remove the odor (Bostick, 2003), the data in Table 11 demonstrate that the unwanted foul fish odor can be removed from the Asian carp bone material with or without charring, and even maintained upon rehydration. This feature was particularly advantageous in terms of storage and handling properties even at low residual organics, but especially when the residual organics were 10% or higher.

To the best of our knowledge, the results demonstrate that Asian carp bones are not only suitable for the production of metal sorbents, but also exhibit highly desirable metal binding properties not found in APATITE II, the current industry gold standard for fish bone metal sorbents. Also, our results are unexpected and surprising, particularly for strontium, and especially nickel. A sorbent comprising uncharred Asian carp bone particles having a similar organic content and binding activity for most metals relative to APATITE II, but without a foul fish odor, is also unexpected and surprising. Accordingly, we believe production of metal sorbents from the bones of Asian carp as described herein will encourage harvesting of not just larger Asian carp, but even those that are smaller so that recruitment overfishing is supported. Moreover, there is an increasing need for new specialized sorbents in environmental technology including groundwater treatment, waste-water treatment, soil and sediment remediation and so forth, which the present metal sorbents provide. As such, the subject disclosure finds use in a variety of different applications and represents a significant contribution to the art.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A method of mitigating an environmental impact of invasive Asian carp comprising:
    recruiting overfishing of a species of Asian carp harvested from one or more rivers or lakes in which the species of Asian carp is invasive, the recruiting overfishing being at least partially induced by a process comprising:
    obtaining fish bones from the harvested Asian carp;
    producing a sorbent from the fish bones by drying and milling the fish bones into sorbent particles having a metal sorption capacity effective for treating a metal contaminated material; and
    treating metal contaminated material with an effective amount of the sorbent to form immobilized reaction products of the metal contaminated material and the sorbent.

2. The method of claim 1, wherein the harvested Asian carp comprise small, sexually immature fish.

3. The method of claim 2, wherein the small, sexually immature fish comprise fish having a length of approximately 300 millimeters.

4. A method of mitigating an environmental impact of invasive Asian carp comprising:
    obtaining fish bones from Asian carp harvested from one or more rivers or lakes in which the Asian carp is invasive, the obtaining fish bones comprising recruiting overfishing of the Asian carp, the recruiting overfishing being based at least in part on a process comprising:

producing a sorbent from the fish bones by drying and milling the fish bones into sorbent particles having a metal sorption capacity effective for treating a metal contaminated material; and treating metal contaminated material with an effective amount of the sorbent to form immobilized reaction products of the metal contaminated material and the sorbent.

5. The method of claim 4, wherein the Asian carp comprise small, sexually immature fish.

6. The method of claim 5, wherein the small, sexually immature fish comprise fish having a length of approximately 300 millimeters.

7. The method of claim 4 further comprising:

producing the sorbent from the fish bones by drying and milling the fish bones into sorbent particles having a metal sorption capacity effective for treating the metal contaminated material, wherein drying comprises heating the fish bones at a temperature of at least about 100° C. for a period of time effective to generate the sorbent particles at water dryness and having a metal sorption capacity effective for treating the metal contaminated material.

8. The method of claim 7 further comprising repeating the obtaining, producing and treating as needed to support harvesting of the invasive fish to mitigate the environmental impact of the invasive Asian carp.

9. The method of claim 7, wherein heating is conducted without charring the fish bones to produce uncharred sorbent particles.

10. The method of claim 9, wherein heating without charring produces the uncharred sorbent particles retaining associated organics while being at least substantially devoid of a foul fish odor.

11. The method of claim 7, wherein the fish bones are dried to about 5% or less moisture content by weight.

12. The method of claim 4 further comprising measuring a metal sorption capacity of a test amount of the sorbent and certifying the sorbent based on the measuring.

13. The method of claim 4, wherein the metal contaminated material is selected from the group consisting of soil, sediment, water, and leachate from a soil or waste site contaminated with metals.

14. The method of claim 4, wherein the sorbent has a metal sorption capacity effective for treating a material contaminated with at least one metal selected from the group consisting of lead, nickel, cadmium, copper, strontium, uranium, and zinc.

15. The method of claim 14, wherein treating the metal contaminated material comprises applying the effective amount of the sorbent at an application rate of about 1% to 10% by weight of the metal contaminated material.

16. The method of claim 15, wherein the sorbent is configured to sorb at least 50 milligrams of Strontium per gram of sorbent.

17. The method of claim 15, wherein the sorbent is configured to sorb at least 5 milligrams of Nickel per gram of sorbent.

18. The method of claim 1, wherein the overfishing incentivizes fishermen to catch Asian carp having a length of less than 300 millimeters.

* * * * *